United States Patent [19]

Lee et al.

[11] Patent Number: 5,475,502
[45] Date of Patent: Dec. 12, 1995

[54] VARIABLE LENGTH-ADAPTIVE IMAGE DATA COMPRESSION METHOD AND APPARATUS

[75] Inventors: Je H. Lee, Seoul; Yong C. Park, Kyungki-Do; Dae H. Yoon, Seoul, all of Rep. of Korea

[73] Assignee: Goldstar Co., Ltd., Seoul, Rep. of Korea

[21] Appl. No.: 994,775

[22] Filed: Dec. 22, 1992

[30] Foreign Application Priority Data

Dec. 23, 1991 [KR] Rep. of Korea .................. 24010/1992

[51] Int. Cl.[6] .......................... H04N 1/415; H04N 1/41; H04N 7/30
[52] U.S. Cl. .......................... 358/433; 358/432; 358/426; 348/384
[58] Field of Search .............................. 358/133, 56, 12, 358/135, 136, 140, 141, 433, 432, 426

[56] References Cited

U.S. PATENT DOCUMENTS 4,984,076  1/1991  Watanabe .............................. 358/133
5,006,931  4/1991  Shirota .................................. 358/133

FOREIGN PATENT DOCUMENTS

0385654  5/1990  European Pat. Off. ....... H04N 7/133
3001662  3/1991  Japan .............................. H04N 1/41

Primary Examiner—Edward L. Coles, Sr.
Assistant Examiner—Allan A. Esposo
Attorney, Agent, or Firm—Fliesler, Dubb, Meyer & Lovejoy

[57] ABSTRACT

Variable length-adaptive image data compression method and apparatus. The statistical characteristic of a frame containing a number of blocks is extracted by blocks and then encoded, so as to achieve a bit distribution for each block. An optimum quantizer is selected which can compress data to a quantity most approximating to the quantity of bits allocated to the AC coefficient of each block. The present invention adopts a variable length coding for providing a high picture quality, but limits the number of classes containing the same number of blocks to a number (for example, 4) predetermined based on the statistical characteristic of input image data. Accordingly, it is possible to easily control the quantity of data and to converge errors into blocks.

1 Claim, 7 Drawing Sheets

| DECISION LEVEL | RECONSTRUCTION LEVEL |
|---|---|
| 0.50000 | 0.00000 |
| 1.50184 | 1.00000 |
| 2.50376 | 2.00376 |
| 3.51660 | 3.01105 |
| 4.52958 | 4.02215 |
| 5.54633 | 5.03700 |
| 6.56687 | 6.05565 |
| 7.59125 | 7.07810 |
| 8.61948 | 8.10440 |
| 9.65160 | 9.13457 |
| 10.68764 | 10.16864 |
| 11.72762 | 11.20664 |
| 12.77158 | 12.24861 |

FIG. 6

| DECISION LEVEL | CONSTRUCTION LEVEL | HUFFMAN CODE |
|---|---|---|
| 0.50000 | 0.00000 | 0 |
| 1.50184 | 1.00000 | 11 |
| 2.50376 | 2.00367 | 1001 |
| 3.51660 | 3.01105 | 100000 |
| 4.52958 | 4.02215 | 100010 |
| 5.54633 | 5.03700 | 1000010 |
| 6.56687 | 6.05565 | 1000111 |
| 7.59135 | 7.07810 | 10000111 |
| 8.61948 | 8.10440 | 10001100 |
| 9.65160 | 9.13457 | 100001100 |
| 10.68764 | 10.16864 | 100001101 |
| 11.72762 | 11.20664 | 100011010 |
| 12.77158 | 12.24861 | 100011011 |
| ESCAPE CODE | | 101 |

FIG. 7

| CLASS | ACTIVITY | BITS/BLOCK |
|---|---|---|
| 1 | 26.4 | 93 |
| 2 | 12.8 | 69 |
| 3 | 5.60 | 48 |
| 4 | 0.97 | 22 |

FIG. 8

VARIABLE LENGTH-ADAPTIVE IMAGE DATA COMPRESSION METHOD AND APPARATUS

BACKGROUND OF THE INVENTION

1. Field of the Invention

The present invention relates to image data compression, and more particularly to variable length image data compression method and apparatus capable of fixing constant length in units which contain the predetermined number of blocks so as to converge errors into the unit and determining the variable length of every block, which is contained in the unit, based on an optimal bit allocation selected according to the kind of image data.

2. Description of the Prior Art

For embodying home-use digital VCRs, it is essentially required to provide image data compression technologies for effectively compressing an enormous quantity of video signals without any degradation in picture quality, In digital VCRs, image data compression technologies should take into consideration such functions as variable speed playback and various editing capabilities, burst errors, and an error propagation, as compared with other image data compression fields such as communications. In particular, the length of encoded data should be fixed by blocks, in order to attain a reasonable picture quality in high speed playback and limit the error propagation to a suitable range while keeping the picture quality acceptable.

However, such a coding length should be adaptively varied, depending on the statistical characteristic of image, so as to obtain a high picture quality, because blocks of a frame are different in the statistical property, namely, the complexity of image. Accordingly, such a fixed length coding for the digital VCR image data compression has a problem of obtaining a poor picture quality, even though it is advantageous in error propagation and high speed playback.

Variable length coding has been also used for the digital VCR image data compression, in order to solve the problem encountered in the fixed length coding. However, such a variable length coding causes wide error propagations, even though it can provide an improvement in picture quality. In particular, the variable length coding has a serious problem of selecting a range at which the variable length is fixed for the high speed playback.

Figure 1:
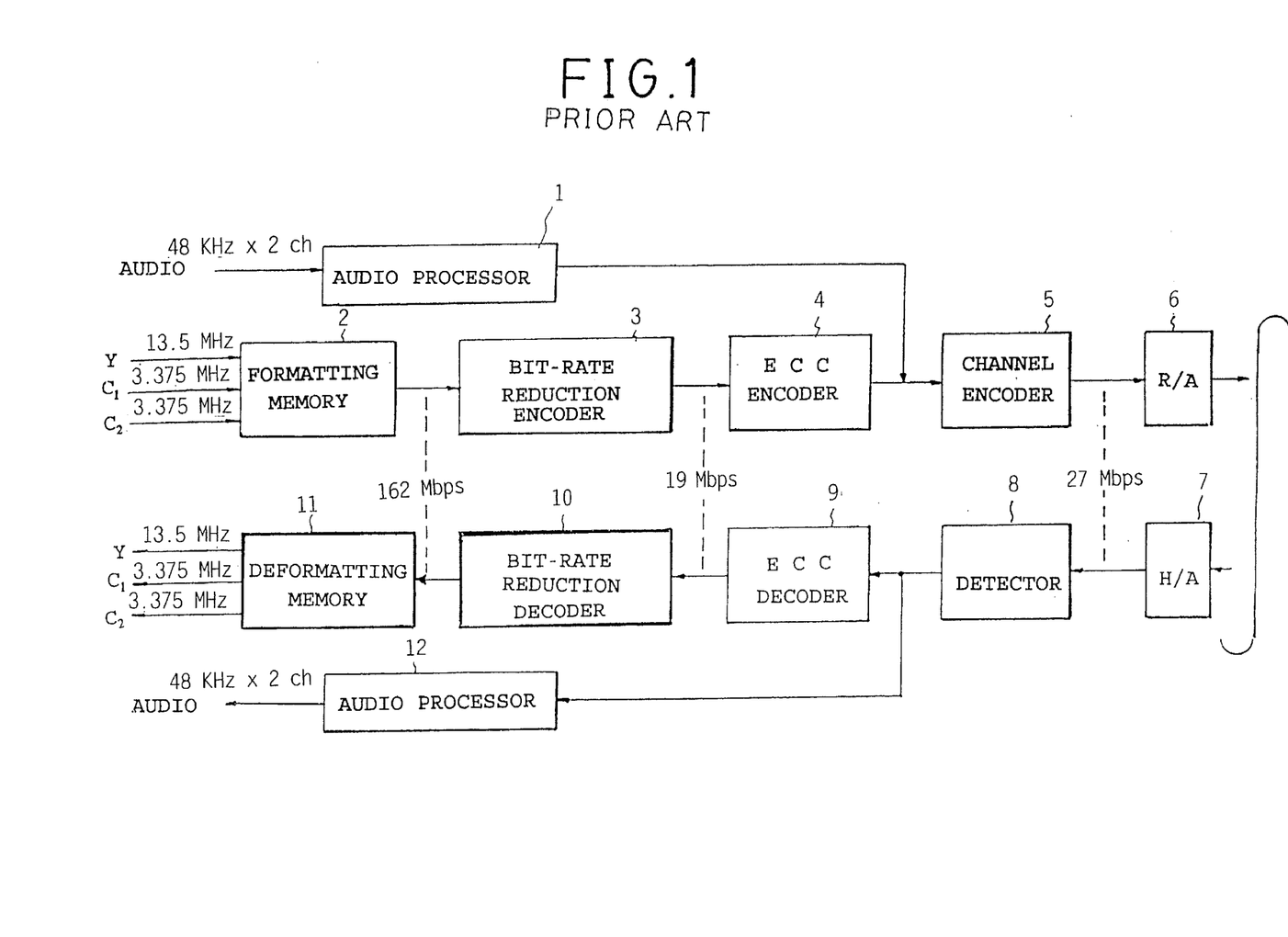
FIG. 1 is a block diagram of a general digital VCR system.
Figure 2:
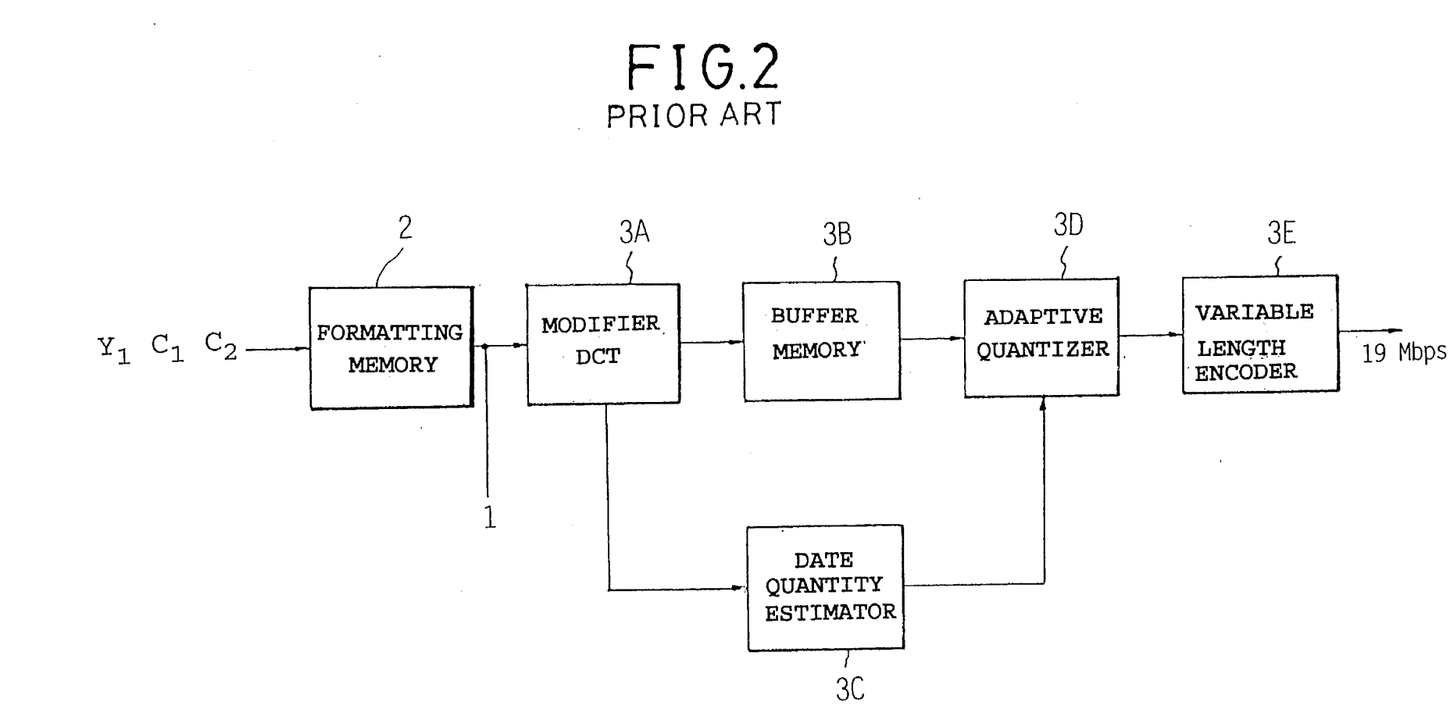
FIG. 2 is a block diagram of a bit rate reduction encoder unit shown in FIG. 1.

FIG. 1 is a block diagram of a conventional variable length coding apparatus for a general digital VCR. FIG. 2 is a block diagram of a bit rate reduction encoder which is denoted by the reference numeral 3. Now, a conventional variable length coding will be described, in conjunction with FIGS. 1 and 2.

Input signals which are inputted at the variable length coding apparatus and the bit rate reduction encoder are digital signals A/D converted by 8 bits. These digital signals are NTSC component image signals each including a luminance signal Y and two color difference signals C1 and C2 sampled at a rate of 4:1:1. In each NTSC component image signal, that is, the luminarice signal Y has a sampling frequency of 13.5 MHz and the difference signals C1 and C2 have sampling frequencies of 3.375 MHz. The input signal transmission rate through a channel is 162 Mbps.

The luminarice signal Y and difference signals C1 and C2 of input video signal are stored in a formatting memory 2 and then supplied to a bit rate reduction encoder 3. In the bit rabe reduction encoder 3, the input video signal including the signals Y, C1 and C2 are compressed to 19 Mbps. These compressed data are inputted at an error-correcting code (ECC) encoder 4 and added with additional bits, to be error-correcting encoded. The data from the ECC encoder 4 is then formed into a so-called sync-block with identification (ID)-information and synchronization-pattern. The sync-block is then recorded on the tape at 27 Mbps with audio signals.

Figure 3A:
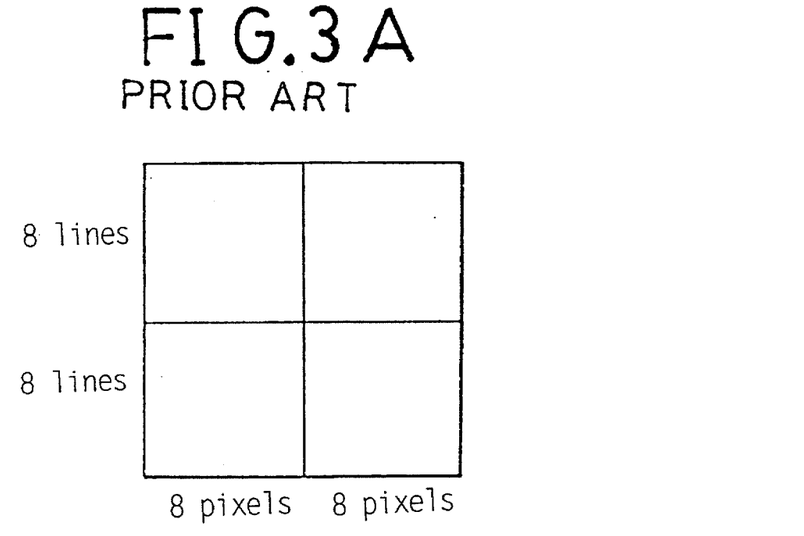
FIG. 3A shows four luminance signal macroblocks each containing 8×8 pixels and FIGS. 3B and 3C show two difference signal blocks each containing 8×8 pixels, respectively.
Figure 3B:
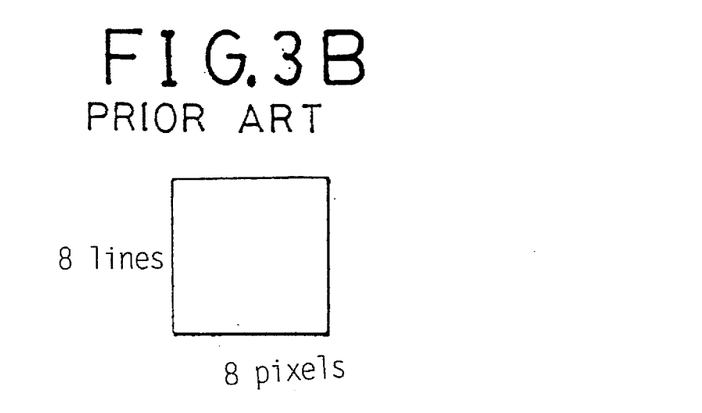
Figure 3C:
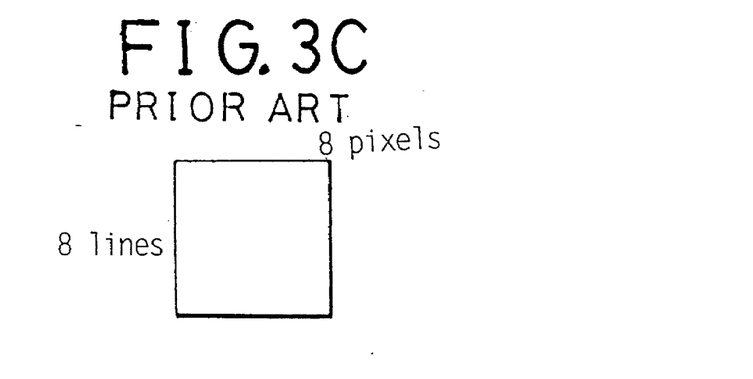

In case of the apparatus shown in FIG. 2, the input video signals Y, C1 and C2 which are inputted at the formatting memory 2. In the formatting memory 2, the input frame is partitioned into macroblocks each containing 8×8 blocks, namely, pixels, as shown in FIG. 3. An DCT(Discrete Cosine Transform) operation is then independently carried out for every pixel, in a modified DCT unit 3A. DCT coefficients obtained in the modified DCT unit 3A are stored in a buffer memory 3B during when a data quantity estimator 30 selects an optimum quantizer.

The data quantity estimator 3C serves to select an optimal quantizer generating minimum errors within a number of bits (for example, 64 bits upon ⅛ compression) allocated to each block, from the prepared quantizers. Accordingly, the coding of each block can be carried out, with the fixed length allocated to the block. The DCT coefficients are quantized by a selected quantizer in a quantization unit 3D and then Huffman-encoded in an encoder unit 3E.

As mentioned above, the conventional image data compression method achieves a image data compression by dividing image signals indicative of a frame into blocks. In this method, the length of data used for achieving a coding for each block is fixed. Basically, the error propagation is converged into blocks, in conventional fixed length coding methods. However, it is inefficient to limit the length of data for achieving a coding to a fixed length for all blocks, because the statistical characteristic is variable, even in one frame. It is true that where the statistical characteristic of image data is constant, the fixed length coding is advantageous, in terms of the error propagation and the high speed playback. However, an efficient image data compression needs the use of the variable length coding method. Accordingly, conventional methods should make a compromise between the above-mentioned contrary requirements. However, there has been no method capable of making such a compromise yet.

SUMMARY OF THE INVENTION

Therefore, an object of the invention is to solve the above-mentioned problems encountered in the prior arts and to provide a variable length-adaptive image data compression method and apparatus capable of limiting the quantity of bits generated for each block to limited kinds of bit quantities, while adopting basically a variable length coding.

In accordance with one aspect, the present invention provides a method for compressing image data comprising the steps of extracting parameters for a frame divided into a plurality of image data blocks, classifying the blocks of the frame based on the parameters, and selecting a quantizer generating errors of the minimum amount for the quantity of bits allocated by classes, the method further comprising the steps of: (a) dividing input image data into a predetermined number of blocks and calculating a DC coefficient and an AC coefficient of each block; (b) calculating an activity level of each block based on the calculated AC coefficient; (c) classifying the blocks into a predetermined number of classes each having the same number of blocks, based on the calculated activity levels of the blocks; (d) quantizing and encoding the DC coefficient calculated at the step (a) for each block; (e) estimating a quantity of bits to be generated when the AC coefficient of each block, based on the number of DC bits required for encoding the corresponding DC coefficient, the number of bits for the quantity of overhead bits and the number of bits allocated to each block in each class and selecting an optimal quantizer generating errors of the minimum amount, based on the estimated quantity of bits; (f) quantizing and encoding the AC coefficient calculated at the step (a) for each block; and (g) combining DC-encoded data, AC-encoded data and overhead information and outputting compressed data.

In accordance with another aspect, the present invention provides an apparatus for compressing image data comprising: a format memory for storing formats of image data (Y, U and V) therein; a block dividing unit for dividing the stored image data into a plurality of blocks; a DCT unit for carrying out a DCT operation for every block and calculating DC coefficients and AC coefficients; a DC quantization unit for carrying out a quantization for every DC coefficient, a Huffman coder for carrying out an variable length coding for every quantized DC coefficient; an activity calculation unit for calculating an activity of every block; a class-classification map unit for classifying every block into a plurality of classes, based on the calculated activity of every block; an optimal bit allocation unit for allocating an optimum length to every classified block; a data quantity estimator unit for receiving outputs from the DCT unit, the Huffman coder, the class-classification map unit and the optimal bit allocation unit, estimating the quantity of bits generated in the AC quantization unit and selecting the optimal quantizer based on the estimated quantity of bits; a buffer memory for storing the AC coefficients processed in the DCT unit; an AC quantization unit for carrying out a quantization for the stored AC coefficients by the quantizer selected by the data quantity estimator unit; another Huffman coder for carrying out a variable length coding for the quantized AC coefficients; and a multiplexer for outputting selectively outputs from the Huffman coders.

BRIEF DESCRIPTION OF THE DRAWINGS

Other objects and aspects of the invention will become apparent from the following description of embodiments with reference to the accompanying drawings in which:

FIGS. 3A to 3C are schematic views illustrating macroblocks wherein

DESCRIPTION OF THE PREFERRED EMBODIMENTS

Figure 4:
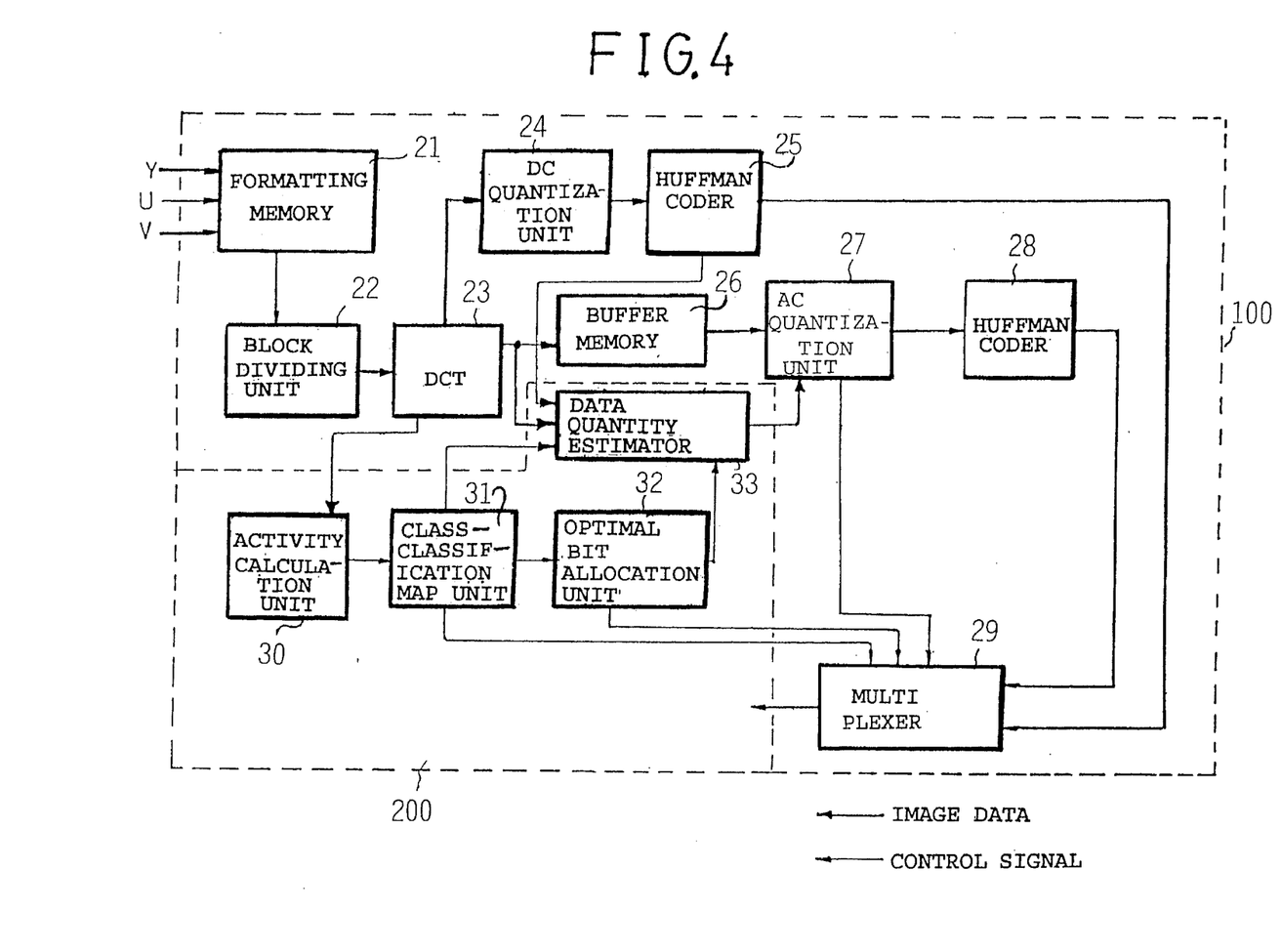
FIG. 4 is a block diagram of a bit compression apparatus which adopts a variable length-adaptive image data compression method according to the present invention.

Referring to FIG. 4, there is illustrated a bit compression apparatus which adopts a variable length-adaptive image data compression method according to the present invention.

As shown in FIG. 4, the apparatus comprises a format memory 21 for storing formats of image data Y, U and V therein, a block dividing unit 22 for dividing the stored image data into a plurality of blocks, a DCT unit 23 for carrying out a DCT operation for every block and calculating DC coefficients and AC coefficients, a DC quantization unit 24 for carrying out a quantization for every DC coefficient, and a Huffman coder 25 for carrying out an variable length coding for every quantized DC coefficient. The apparatus also comprises an activity calculation unit 30 for calculating an activity of every block, a class-classification map unit for classifying every block into a plurality of classes, based on the calculated activity of every block, an optimal bit allocation unit 32 for allocating an optimum length to every classified block, a data quantity estimator unit 33 for receiving outputs from the DCT unit 23, the Huffman coder 25, the class-classification map unit 31 and the optimal bit allocation unit 32, estimating the quantity of bits generated in the AC quantization unit 27 and selecting the optimal quantizer based on the estimated quantity of bits, a buffer memory 26 for storing the AC coefficients processed in the DCT unit 23, an AC quantization unit 27 for carrying out a quantization for the stored AC coefficients by the quantizer selected by the data quantity estimator unit 33, another Huffman coder 28 for carrying out a variable length coding for the quantized AC coefficients, and a multiplexer 29 for outputting selectively outputs from the Huffman coders 25 and 28.

Coding parameters include a class (expressed by 0, 1, 2 and 3:2 bits), an allocated bit quantity (0 to 255: expressed by 8 bits and four kinds), and a quantizer index (0 to 31: expressed by 5 bits).

The class is a parameter indicative of a class allocated to every block based on the activity of every block. On the other hand, the quantizer index is a parameter indicative of a quantizer selected from 32 quantizers by the data quantity estimator 33.

The block dividing unit 22 serves to divide a frame into a plurality of blocks. For every block, the DCT operation is carried out in the DOT unit 23. The activity calculation unit 0 calculates the activity level of every block.

Figure 7:
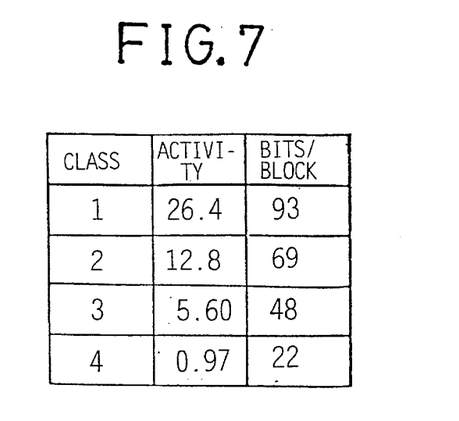
FIG. 7 is a table illustrating an allocation of variable length bit quantity.

In the class-classification map unit 31, the blocks of one frame are classified into four classes having the same number of bits, based on the calculated active levels. For every classified block, an optimum number of bits are allocated in the optimum-bit allocation unit 32. FIG. 7 shows the number of variable length-coded bits allocated to every class, taking into consideration the characteristic of image data.

Although utilizing the variable length coding, such a image compression makes it possible to simplify the overall system, since the blocks are classified into only four classes. This feature is also suitable for special functions of VCRs.

Now, the operations of the system according to the present invention will be described in detail.

First, the activity calculation and the class-classification for every block will be described.

The activity levels of blocks of a frame are calculated by the energy of AC coefficients, in that the energy of AC coefficients is directly related to the complexity of blocks.

In a frame containing M×N blocks, the energy $E_{i,j}$ of the AC coefficient of the (i,j)-th block is calculated by the following equation:

$$E_{i,j} = \sum_{U=0}^{7} \sum_{V=0}^{7} [F_{i,j}(U,V)]^2 - F_{i,j}^2(O,O) \qquad (1)$$

where, i=0, 1, 2, ..., M/8 j=0, 1, 2, ..., N/8

The activity ACT(i,j) of the (i,j)-th block which is calculated by the absolute sum of the AC coefficients is obtained from the following equation:

$$ACT(i,j) = \sum_{M=0}^{7} \sum_{N=0}^{7} |X(I+M, J+N)| - DC(i,j) \qquad (2)$$

The block classification is carried out by utilizing an cumulative distribution function (CDF) for activity values of all blocks, so as to classify the blocks into four classes including the same number of blocks. Accordingly, the average bit rate of one frame is maintained and the data quantity has a regularity. It is not necessarily optimum to provide four classes. However, this number of classes was obtained from a compromise between the complexity and the improvement in picture quality in many classes. The compromise is experimentally determined.

Second, the optimum bit allocation is achieved in such a manner that many bits are allocated to blocks classified as a high level, while small bits are allocated to blocks classified as a low level. Accordingly, it is possible to achieve an adaptive coding. In this case, the size of allocated bits can be determined by the well-known mean square error-based method which is one of transform coding methods.

In actual cases, the adaptive coding is achieved by modifying the marginal analysis which is one of the optimum bit allocation methods based on MSE. That is, B bit is allocated in this case, as compared with the marginal analysis by which bits of a positive number are allocated. The B bit is related to an preciseness and experimentally calculated.

The bit allocation procedure for minimizing the quantization errors among DCT coefficients of every class is carried out by the following steps. In the following description, F(Bi) is an equation for calculating the quantization errors of the DCT coefficients of every class, whereas j and N are the number of iteration times of algorithm and the number of classes, respectively.

Step 1) $B^j_K$ which is the number of bits allocated to the K-th class by the j-th iterative procedure is initialized ($B^O_K$ =O). Herein, 0<K<N-1 and j=1;

Step 2) $B^j_K$ satisfies the equation of $$B^j_K = B^{j-1}_K + B \times (k-i).$$

At this time, the index for i is selected to maximize k (k=[f($B^{j-1}_K$)−f($B^{j-1}_K$+B)]). Herein, k is a quantization error decrement when the j-th B bit is allocated in case of quantizing the k-th class.

Step 3) The iterative procedure is completed when the following condition is satisified. If not, the procedure is returned to the step 2.

$$\sum_{k=1} B^{jk} > N \cdot B$$

Based on the $B_k$ calculated as above, the number of allocated bits to every class is determined. That is, the number of bits $M_k$ can be calculated by the equation of $M_k$ (bit) =$B_k$ (bit/pixel)×64 (pixel).

Third, the DC coefficients are quantized. In most cases, the coefficients transformed by the DCT unit 23 are classified into DC coefficients and AC coefficients to be quantized independently.

Generally, the DC coefficients are uniformly quantized and then coded to 8 bit codes. Other methods for obtaining an improved compression effect may be also used, as the adaptive DCT (ADCT) recently proposed by JPEG et al.. A DC estimation is also carried out for the DC coefficients, after the uniform quantization, but before the Huffman coding. The DC estimation is a procedure for calculating the difference between the quantized DC value of the current block to be coded and the quantized DC value of the just previous block. Generally, a small difference of DC coefficient is obtained, since a large correlation is present between DC coefficients of neighboring blocks in a transform zone. By Huffman-coding the difference of DC coefficient, it is possible to enhance the compression efficiency of image data.

Fourth, The AC coefficients are quantized. The transformed AC coefficients constituting blocks of every class are quantized by nonuniform quantizers and then coded by the Huffman coder unit. In this case, Laplacian nonuniform quantizers with 513 levels are used which are obtained according to an optimum nonuniform quantizing method proposed by Lloyd-Max. In order to simplify the procedure and reduce the seek time, only 26 levels of the foremost portion of the table are used. As a result, many AC coefficients having a small size are generated. However, these AC coefficients have a minor influence.

Where the nonuniform quantizers are used, it is necessary to normalize the input signals by calculating the distribution values of the input signals. Accordingly, overhead information about the distribution values should be transmitted to the inputs of the nonuniform quantizers.

Ngan et al. have proposed nonuniform quantizers with a simple construction eliminating the above-mentioned normalization procedure. The nonuniform quantizers are scaled by a multiplying constant so that all AC coefficients having a decision level d(j) of not more than 0.5 and a reconstruction level r(j) of not more than 0.5 are quantized to zero. The multiplying constant, the decision level and the reconstruction level are expressed by the following equations:

$$\delta = \frac{0.5}{d(1)} \qquad (2\text{-a})$$

$$\bar{d}(j) = \delta \times d(j) \qquad (2\text{-b})$$

$$\bar{r}(j) = \delta \times r(j) \qquad (2\text{-c})$$

where, d(1): the first decision level of the Laplacian nonuniform quantizers;

$\bar{d}(j)$: the decision level of the scaled quantizer;

$\bar{r}(j)$: the reconstruction level of the scaled quantizer.

Figure 5:
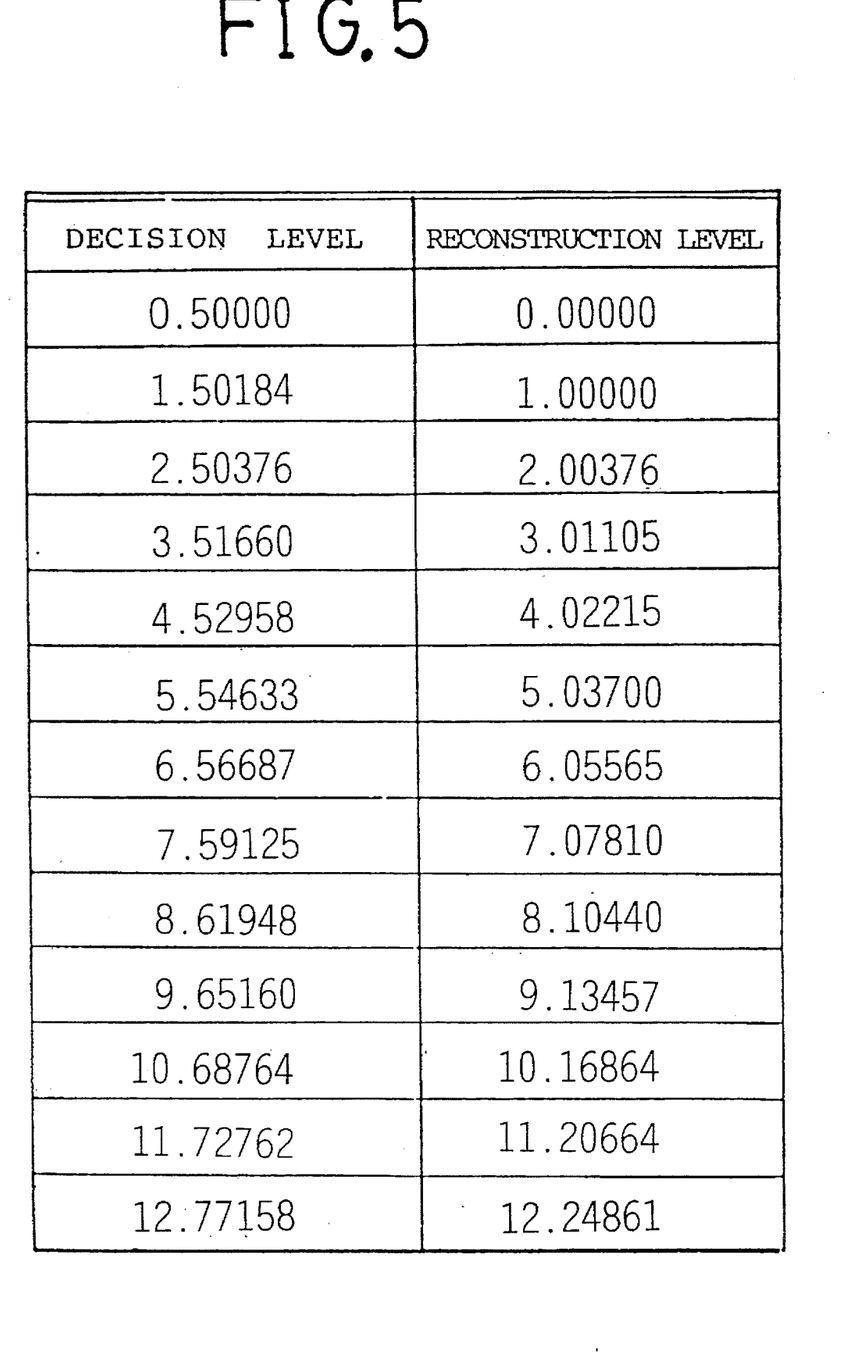
FIG. 5 is a table illustrating a quantization by a truncated scaled Laplacian nonuniform quantizer.

Referring to FIG. 5, there is illustrated the decision level and the reconstruction level of a quantizer scaled as mentioned above. Among various quantizers prepared, a optimal one is selected which has a coded length most approximating to the bit size allocated to every block. The selection of quantizer is achieved, based on the calculation by the data quantity estimator 33.

Fifth, the Huffman coding is carried out for the quantized DCT coefficients in such a manner that short length codes are allocated to coefficients of a high generation rate, while long length codes are allocated to coefficients of a low generation rate.

Generally, the Huffman coding is a variable length coding. The variable length coding has an advantage that the overall system is simplified in that the coding is achieved only by a look-up table. Individual look-up tables are used for coding DC coefficients and AC coefficients. For example, the coding of DC coefficients is accomplished by using a DC Huffman coding table proposed by JPEC.

The quantized AC coefficients are coded by using a VLC look-up table. This VLC look-up table contains Huffman codes obtained from image data coefficients generally transformed. Where truncated scaled nonuniform quantizers are used for AC coefficients, it is desirable to carry out the variable length coding by using a truncated Huffman code table, since the range of quantizers is truncated.

Figure 6:
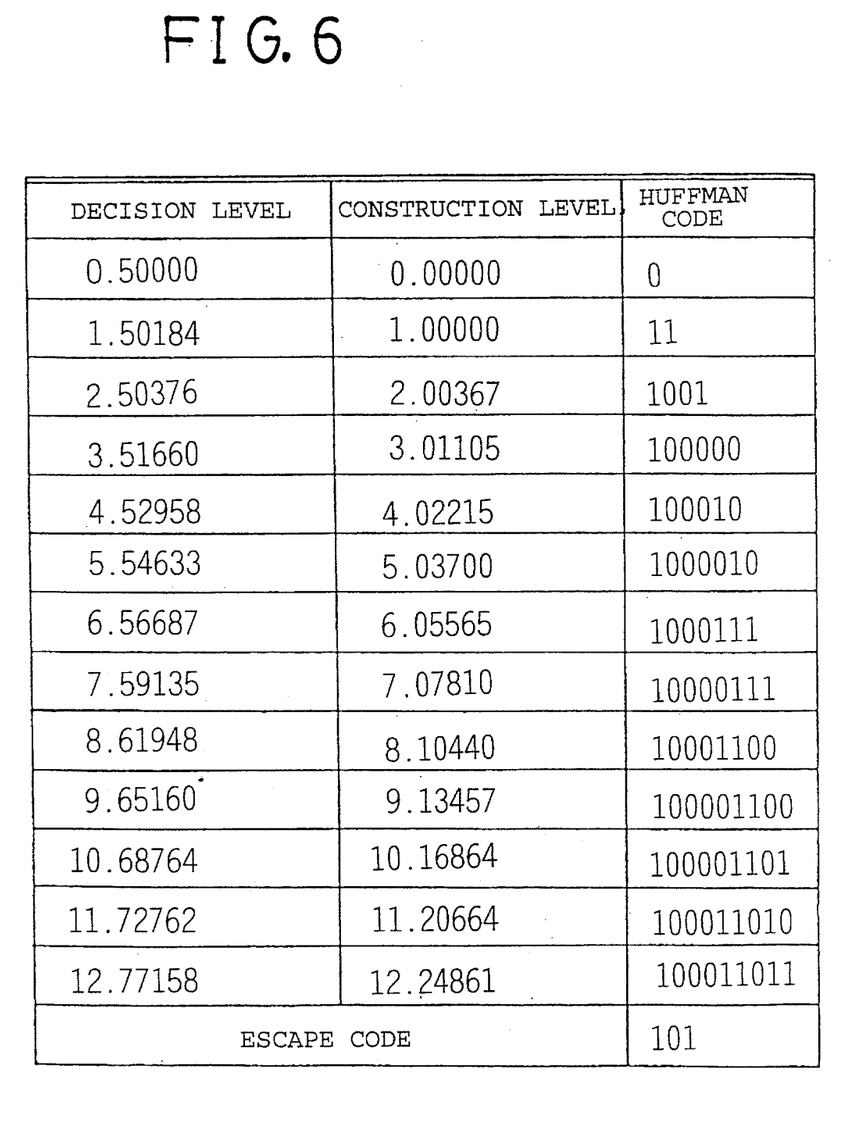
FIG. 6 is a table illustrating Huffman codes and a quantization by a truncated scaled Laplacian nonuniform quantizer.

FIG. 6 shows examples of truncated scaled Laplacian nonuniform quantizers and truncated Huffman codes.

Sixth, the data quantity estimator 33 is operated. Since the activity levels of blocks of one frame are various, coding bits are allocated adaptively to the active level of every block.

The data quantity estimator 33 estimates previously data quantity of variable length codeword from each quantizer and selects the best quantizer. The operation of the data quantity estimator 33 will be described, in conjunction with FIG. 8.

The decision levels and the reconstruction levels of the truncated scaled Laplacian quantizers are illustrated in FIG. 5. 32 quantizer range scaled factors Rm (m=1, 2, 3, 4, . . . , and 32) can be obtained by multiplying the decision levels of the truncated Laplacian quantizers with the reconstruction levels of the same quantizers. That is, .the decision level $dm(j)$ and the reconstruction level $rm(j)$ of the m-th quantizer modified by the quantizer range scaled factors Rm can be calculated by the following equations:

$$dm(j)=\delta \times Rm \times d(j) \tag{3-a}$$

$$rm(j)=\delta \times Rm \times r(j) \tag{3-b}$$

where, m =0, 1, 2, 3, . . . , and 32.

The method which uses a fixed table of truncated Huffman codes for coding quantized values has an advantage of simplifying the overall system, in that Laplacian quantizers of the maximum number of 32 with different sizes are designed according to Lloyd-Max algorithm, although its performance is slightly inferior, as compared with a method which uses individual Huffman tables for coding quantized values.

The above-mentioned data quantity estimation is carried out by the following steps.

Figure 8:
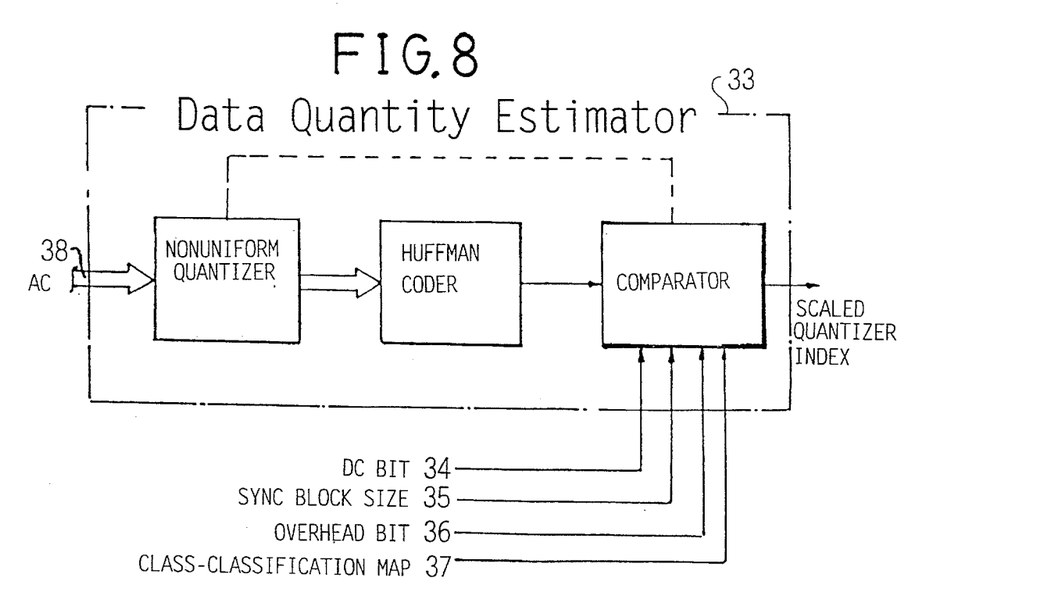
FIG. 8 is a block diagram of a data quantity estimator unit shown in FIG. 4.

Step 1) At the data quantity estimator 33 are inputted the quantity of DC bits (DO bit lines 34) used for coding the DC coefficient of the corresponding block, the quantity of overhead information (overhead bit lines 37) such as a class map, the quantity of bits allocated to the block (SYNC BLOCK SIZE lines 35) and the AC coefficient 38 which the block contains. The value obtained by subtracting the quantity of DC bits from lines 34 and the quantity of overhead bits from lines 37 from the quantity of total bits from lines 35 allocated to the block is the net quantity of bits allocated to the AC coefficients 38.

Step 2) The AC coefficients are quantized by quantizers scaled by the largest value RO of the prepared quantizer range scaled factor Rm. For these quantized AC coefficients, a variable length coding is carried out using the truncated Huffman code table.

Step 3) The quantity of variable length encoded data for AC coefficients is calculated. The calculated data quantity is then compared with the quantity of bits allocated to the AC coefficient of the corresponding block, Step 4) The step 2 is iteratively carried out, while varying the quantizer range scaled factor Rm, until a quantizer is selected which can compress data to a quantity most approximating to the quantity of bits allocated to AC coefficients and preventing an overflow.

With the above procedure, it is possible to select the best quantizer for every block and thus to output a quantizer index from every selected quantizer. The quantizer indicia are inputted at the input of the AC quantization unit, to be used in a decoding procedure.

As apparent from the above description, the present invention adopts a variable length coding for providing a high picture quality, but limits the number of classes containing the same number of blocks to a number (for example, 4) predetermined based on the statistical characteristic of input image data. Accordingly, it is possible to easily control the quantity of data and to converge errors into blocks.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for compressing variable length input image data comprising the steps of:

(a) dividing the input image data into a predetermined number of blocks and calculating a DC coefficient and an AC coefficient for each block;

(b) calculating an activity level for each block, to represent the complexity of each block, based on said AC coefficient for each block;

(c) classifying the blocks into a predetermined number of classes, each having the same number of blocks, based on the calculate, d activity level for each of the blocks;

(d) quantizing and encoding said DC coefficient for each block into DC-encoded data formed of a number of DC bits for each block;

(e) estimating a quantity of AC bits for encoding the AC coefficient for each block based on the number of DC bits for each block, based on a quantity of overhead bits representing overhead-encoded data derived from encoding overhead information and based on a total number of bits allocated to each block in each class, and selecting an optimal quantizer for generating the least error based on the estimated quantity of AC bits; said estimating step including, (e-1) inputting the quantity of DC bits used for coding the DC coefficient of each block, the quantity of overhead bits used for coding overhead information, and the total number of bits allocated to the block;

(e-2) allocating an allocated quantity of AC bits for encoding the AC coefficient in each block by subtracting the quantity of DC bits and the quantity of overhead bits from the total number of bits allocated to the block;

(e-3) quantizing the AC coefficient for each block by a quantizer scaled by a largest value CRO) in a prepared quantizer range scaled factors (Rm) set and carrying out a variable length coding of the quantized AC coefficient by using a truncated Huffman code table;

(e-4) calculating a calculated quantity of bits used for the variable length coding of the step (e-3) and comparing the calculated quantity and the allocated quantity;

(e-5) carrying out the steps (e-3) and (e-4) iteratively, while varying the scale factor in the quantizer range scaled factor set, until said calculated quantity most closely approximates said allocated quantity without said calculated quantity exceeding said allocated quantity;

(f) quantizing and encoding said AC coefficient for each block using said optimal quantizer to form AC-encoded data; and (g) combining said DC-encoded data, said AC-encoded dam and overhead-encoded data to form a compressed data output.

* * * * *